Jan. 12, 1960 A. B. FOYE 2,920,778
TWIST-OFF CLOSURES
Filed March 5, 1957

United States Patent Office 2,920,778
Patented Jan. 12, 1960

2,920,778

TWIST-OFF CLOSURES

Allen Bradford Foye, West Bridgewater, Mass., assignor to W. R. Grace & Co., Cambridge, Mass., a corporation of Connecticut Application March 5, 1957, Serial No. 643,971

1 Claim. (Cl. 215—40)

This invention relates to a novel closure, and more particularly to an improved twist-off closure which will form a hermetic seal on bottles, jars, and similar containers. As is well known, a wide variety of food products is now sold in glass containers fitted with a "twist-off" cap so that, after one has removed some of the food contents, the cap may be replaced and the food remaining in the container will be hermetically sealed and protected.

Lug and screw caps seal against the "top sealing surface" or rim of the container by compressing a gasket between the panel of the closure and the seal surface. The difficulties which are associated with closures of this type arise most frequently, because in comparison with the precise dimensions and minute tolerances which may be secured in metal by machine operations, molded glass manufacture is a highly inaccurate art. The glass container industry has adopted rigid standards and tolerances and does manufacture products which lie within these tolerances, nevertheless, the inaccuracy of the glass molding process demands that the inherent dimensional variations be compensated for by a gasket which has considerable mass and which may be plastically deformed into secure contact with the entire sealing rim of the container. Conventionally, glass inaccuracy has been overcome by screwing the cap down so tightly that the panel is distorted to overcome any displacement in the axis of the glass threads or lugs and the gasket is compressed so much that it is brought into contact with the top sealing surface of the container rim despite "dips."

When this is done, complaints are received by the food packers, for the force required to remove the closure may be so high that the housewife cannot apply torque enough to twist off the cap. In despair, she destroys it instead.

From observations made during some hundreds of test packs, I have determined that if the gasket, as now is common practice, extends across the sealing surface and abuts its periphery against the skirt of the closure, some of the gasket substance, as a result of the applied turn-down force, becomes wedged between the skirt and the sidewall of the container and these wedged areas are frequently responsible for the stuck caps or the frequent high removal forces which must be applied before the container can be opened. I have observed also that high "turn down" can be responsible for "leakers," "low vacuums," and other deviations from an effective hermetic seal. This comes about because that portion of the gasket which is displaced may pack into positions where it resists pressure which the closure is otherwise capable of exerting upon top sealing surface and microleakage results.

Considering the case where the axis of the glass threads or lugs is not perpendicular to the plane of the sealing surface, in the capping operation, the panel of the cap will be perpendicular to the axis of the glass threads or lugs at the moment when the gasket first touches the glass. As the cap is screwed down further, the glass sealing surface will be driven further and further into the gasket; nevertheless maximum sealing pressure will exist only at the area of first contact and progressively reduced sealing pressures exist around the remainder of the glass sealing surface periphery.

This situation is exaggerated because the ordinary screw cap has but 225 degrees of contact between the cap thread and glass thread and a lug cap usually has but four points of contact with the glass. In such cases the panel can and does bow upwards wherever it is not restrained and the tighter the cap is screwed on, the more accentuated the pressure non-uniformity becomes.

From these observations it became evident to me that by following conventional practice, i.e., providing a gasket which touches the skirt around its periphery and extends across the sealing surface, and then bedding the glass in the gasket, the sealing pressure could never be uniform except on "ideal" glass.

On the other hand, it appeared to me that if the gasket could be made to approach the glass along a single line of contact, a seal could be effected even if the axis of the glass threads were not normal to the sealing surface. Then, if that gasket could be prevented from flowing radially, a somewhat thicker gasket would become economically feasible, obviating leakage at "dips." Less plastic, harder gasket materials could then be used, higher and subsequently more effective sealing pressures per unit area could be developed, and buckling of the closure panel when applied to maximum and minimum glass could be minimized.

The closure designed with these objects in mind is described in the specification and the accompanying drawings. Not only is the sealing performance on maximum and minimum glass materially improved, but the torque required to remove the cap is greatly lowered. The average torque required by a screw cap containing the conventional cut rubber ring gasket is about 70 inch/pounds. The average torque required to remove caps made according to this invention is 42 inch/pounds.

Insofar as the present invention is concerned, it makes no difference what mechanical means is used to hold the cap into engagement with the exterior wall of the container; i.e., it is immaterial whether the closure skirt be provided with lugs, which engage mating bosses on the container, or whether partial or interrupted threads which mate with threads formed on the container be used as the retaining means. Consequently, to save prolixity in the specification and in the claims and for clarity in the drawings, only the lug type of such closures is shown or discussed, but by way of example only. It is to be understood that the word "lug" has been used as a convenient short term and includes within its meaning screw threads and other equivalent closure holding means.

Figure 1:
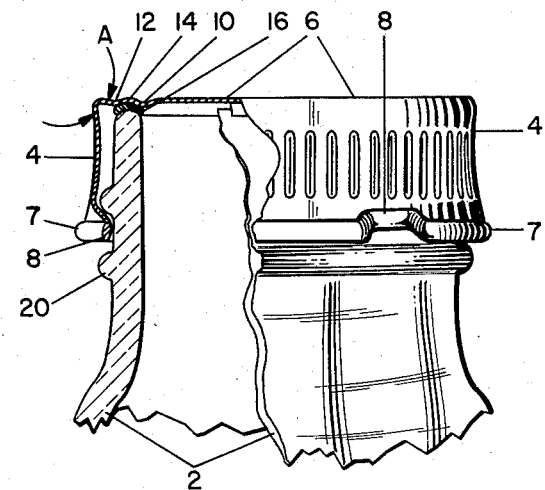
Figure 1 is a side elevation view, partly in section, showing a preferred form of closure cap in accordance with the teachings of this invention mounted on a container.

Referring now to the drawings, and more particularly to Figure 1, there is shown the top or neck portion of a container 2, here illustrated as a glass jar, having a closure cap secured thereto. The cap consists of a cylindrical skirt portion 4 and a cover portion 6, the skirt portion 4 extending downwardly from the outer periphery of the flat and circular cover portion 6. It will be noted that the cylindrical skirt portion 4 and cover portion 6 are portions of a unitary cap formed from a single piece of metal. This one-piece cap construction preferably formed from sheet-metal stock by well-known forming operation, such as stamping and drawing.

The generally flat and circular cover portion 6 has a circumference which is somewhat greater than the circumference of the top of the container which the cap is to cover. The lower edge of skirt portion 4 is provided with a beaded or rolled edge 7, and at appropriate intervals (most often three or four) the beaded or rolled edge 7 is crimped or turned inwardly to form a plurality of inwardly projecting lugs or lip members 8 that are adapted to engage the outwardly projecting threads 20 formed on the neck portion of container 2. The outwardly projecting threads 20 are slightly inclined in a downward direction with respect to the plane of the mouth of container 2.

Near the outer periphery of the cover portion 6 but spaced therefrom are two concentric circular indentations or grooves 10 and 12 which define an upwardly curved area 14 therebetween. Curved area 14 appears as a circular raised portion or bead when viewed from above and appears as a circular groove when viewed from below.

As can be seen from the drawings, the circular groove on the underside of cover 6 formed by curved portion 14 serves as an anchoring channel for a ring of gasketing material 16. This groove is located directly above the top edge of the rim of the mouth of the container, so that gasket ring 16 is centered with respect to the top edge of the rim. It is preferred to form the grooves 10 and 12 by pressing them into the cover portion 6 from above, so that the top of circular bead 14 remains substantially in the plane of the upper face of the cover 6.

The gasketing material itself may consist of an elastomeric compound such as rubber, plastic, or any other suitable natural or synthetic polymeric material. Fillers or solid material may be added to the elastomeric compound in some instances. The gasketing material may either be preformed by molding into an appropriate ring shape and then subsequently bonded in place within groove 14 by cement or similar material, but preferably, because it is now possible to produce liquid gasket forming compounds which can be converted into solid gaskets without flowing out of position as the cure is taking place, the gasketing material is applied on the desired area in liquid form by a lining machine having two or more small nozzle tips which whip around the intended gasket area as the closure caps are successively passed through a lining machine. Subsequent "fluxing" or air or heat curing follows the demands of the composition which is used.

Figure 2:
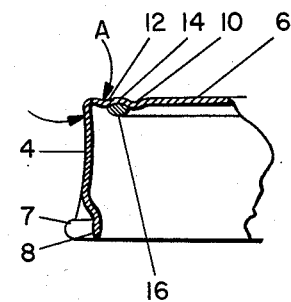
Figure 2 is a fragmentary sectional view of the closure cap of Figure 1 showing the form of the gasket ring before the cap is clamped onto the container.
Figure 3:
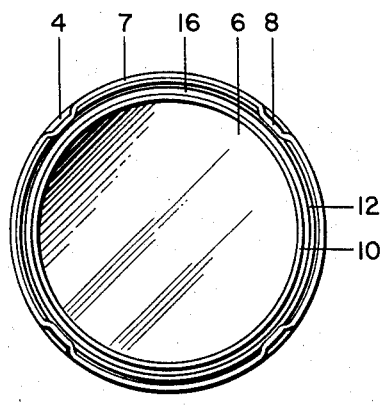
Figure 3 is a plan view from below of the closure cap of Figure 1 but on a smaller scale.
Figure 4:
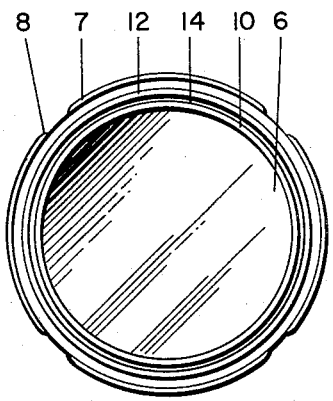
Figure 4 is a plan view from above of the closure cap of Figure 1 and on the same scale as Figure 3.

As the drawing (Fig. 2) shows, the preferred configuration of the gasket is an elliptical cross section, for this cross section reduces the area of contact and permits the formation of what approaches (as contrasted with the bedded seal which is now used) a "line of contact" seal.

But the position of the gasket is of even greater importance. It should be placed to cover only the curved area 14 and must not extend beyond the confines of indentations 10 and 12. The reason for this becomes apparent from Fig. 1 where it is seen that, as the cap is turned down and the gasket 16 is compressed, the indentations 10 and 12 approach the glass and, as they do so, direct a force radially inward toward the glass which opposes the lateral flow of the gasket 16 across panel 6 or into the angle area A. Since indentations 10 and 12 are equal in depth and radius the forces which they develop are approximately equal. The result is that despite compression, these balanced forces resist both inwardly and outwardly directed radial flow and substantially the whole mass of the gasket remains pressed directly against the sealing surface. Nothing interferes with the spring effect exerted at the angle A.

When the cap closure is screwed or turned downwardly upon the top of container 2, the outwardly projecting threads 20 press against lip members 8 and this pressing action tends to increase the angle A between the skirt 4 and the outer annular portion of cover 6 lying outside of groove 12. However, due to the fact that a spring-like relationship exists between skirt portion 4 and cover portion 6, skirt portion 4 and cover portion 6 exert a resilient force which acts in opposition to the turn-down forces, which tend to increase angle A. The end result of these opposing forces, of course, is that the cover portion 6, particularly curved area 14, is pressed very tightly against the upper rim of container 2. Thus, by the appropriate engagement of inwardly projecting lip members 8 with threads 20, it is possible to insure that the cover portion 6 of the closure cap will be tightly sealed upon the top of container 2, due to the resilient and spring-like forces which are set up in the novel closure cap of this invention. Concentric indentations 10 and 12 in the top cover 6 (which appear as ridges when viewed from the underside) essentially constitute parallel walls on the underside which confine the gasketing material within a restricted area immediately above the top edge of the rim of the container mouth, and also serve to prevent the gasketing material from being wedged out of place laterally while the closure cap is being screwed down upon the top rim of the container. This lateral restriction of the movement of the elastomeric gasketing material is quite important for several reasons. First of all, if the gasketing material were not so restricted, a part of it might very well flow or be extruded outwardly in a radial direction and lodge itself in the area between the outer wall of container 2 and the inner wall of skirt 4 particularly in the area adjacent to the apex of angle A. Lateral flow of the gasketing material in this fashion would be quite undesirable since it could materially inhibit the very desirable spring action relationship which exists between the skirt 4 and the cover 6. In other words, if elastomeric material is laterally displaced into the area adjacent to the apex of angle A, the normal resilient relationship between cover portion 6 and skirt portion 4 will be at least partly destroyed, with the result that the gasket may not press as tightly as possible against the upper rim of container 2. Also, lateral restriction of the movement of the elastomeric gasketing material is desirable and important from the standpoint that if a substantial portion of the gasketing material is caused to be displaced inwardly under the influence of turn-down pressures, the higher sealing pressure per unit area which this cap is capable of developing cannot develop, for the pressure relieves itself by the continuing "flow" of the gasket into the head-space.

It will be observed that the present invention provides an effective and reliable closure cap construction which may be readily and inexpensively manufactured. The invention eliminates the necessity for employing closure caps consisting of two or more separate parts. In addition, the closure cap is designed to provide a more secure seal than those heretofore known and used due to the fact that the gasketing material is a yieldable material and is resiliently held against the upper edge of the rim of the container mouth as a result of the spring-like cooperation between the skirt and cover portions.

I claim:

A unitary closure for a container having an at least substantially circular mouth and means cooperating with said closure for tightening said closure on the mouth of said container, said closure comprising an at least substantially circular planar lid portion and an integral cylindrical skirt depending from the periphery of said lid portion, said lid portion having a greater diameter than the outer diameter of said mouth, said lid portion having concentric indentations at least substantially equal in shape and extending downwardly from the plane of said lid portion, said indentations being spaced from said skirt and disposed at least substantially in alignment with the inner and outer edges of said mouth, said lid portion having an upwardly curved groove between said indentations, the top of said groove being in the plane of said lid portion, and a deformable gasket ring having a normally eliptical cross-section disposed in said groove, the lower extremity of said gasket ring normally projecting below the lower extremities of said indentations, whereby when said closure is tightened on the mouth of said container, the lower extremity of said gasket ring initially presses against the sealing surface of said mouth, and said indentations prevent lateral flow of said gasket ring as said closure is tightened on said container.

References Cited in the file of this patent

UNITED STATES PATENTS

| | | |
|---|---|---|
| 2,085,934 | Van Till | July 6, 1937 |
| 2,130,746 | Scofield | Sept. 20, 1938 |
| 2,428,392 | Socke | Oct. 7, 1947 |
| 2,456,972 | Maeder et al. | Dec. 21, 1948 |
| 2,484,039 | Krueger | Oct. 11, 1949 |

FOREIGN PATENTS

| | | |
|---|---|---|
| 360,469 | Great Britain | Nov. 6, 1930 |